(12) United States Patent
Klausmann et al.

(10) Patent No.: US 9,428,130 B2
(45) Date of Patent: Aug. 30, 2016

(54) ROOF FOR A MOTOR VEHICLE

(71) Applicant: Bayerische Motoren Werke Aktiengesellschaft, Munich (DE)

(72) Inventors: Nicole Klausmann, Munich (DE); Andreas Fallmann, Karlsfeld (DE); Michael Fahmueller, Haar (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/909,662

(22) Filed: Jun. 4, 2013

(65) Prior Publication Data

US 2013/0320708 A1  Dec. 5, 2013

(30) Foreign Application Priority Data

Jun. 5, 2012 (DE) .................. 10 2012 209 498

(51) Int. Cl.
B60R 13/02 (2006.01)
B60R 21/04 (2006.01)

(52) U.S. Cl.
CPC .................... B60R 21/04 (2013.01)

(58) Field of Classification Search
CPC ........ B60R 21/04; B60R 13/02; B60R 13/01
USPC ..................... 296/214, 187.05; 280/748, 751
See application file for complete search history.

(56) References Cited

U.S. PATENT DOCUMENTS

| 4,186,232 | A | * | 1/1980 | Cocca et al. | 428/177 |
| 5,806,889 | A | * | 9/1998 | Suzuki et al. | 280/748 |
| 5,823,611 | A | * | 10/1998 | Daniel et al. | 296/214 |
| 6,102,436 | A | * | 8/2000 | Bayley et al. | 280/753 |
| 6,475,937 | B1 | * | 11/2002 | Preisler et al. | 442/370 |
| 7,309,521 | B2 | | 12/2007 | Brown | |
| 7,384,095 | B2 | * | 6/2008 | Cormier et al. | 296/214 |
| 7,954,883 | B2 | * | 6/2011 | Benkler et al. | 296/187.05 |
| 8,201,671 | B2 | * | 6/2012 | Cho | 188/377 |
| 2007/0114772 | A1 | * | 5/2007 | Evans | B60R 21/045 280/753 |
| 2010/0244469 | A1 | | 9/2010 | Gerwolls et al. | |
| 2010/0253114 | A1 | * | 10/2010 | Ohmiya et al. | 296/187.05 |

FOREIGN PATENT DOCUMENTS

| DE | 3304342 | * | 8/1984 |
| DE | 196 35 142 A1 | | 3/1998 |
| DE | 102 27 406 A1 | | 1/2004 |
| DE | 101 63 822 B4 | | 8/2005 |
| DE | 10 2005 026 237 A1 | | 1/2006 |
| DE | 10 2005 015 203 A1 | | 11/2006 |
| DE | 10 2010 016 160 A1 | | 11/2010 |
| EP | 0826556 | * | 4/1998 |

OTHER PUBLICATIONS

German Search Report dated Feb. 21, 2013 w/ partial English translation (nine (9) pages).

* cited by examiner

*Primary Examiner* — Dennis H Pedder
(74) *Attorney, Agent, or Firm* — Crowell & Moring LLP

(57) ABSTRACT

A roof for a motor vehicle includes at least one roof element, at least one lining element by which the roof element is lined at least partially towards a passenger compartment of the motor vehicle, and at least one energy absorption element coupled to the lining element for at least partially decelerating an occupant impacting the energy absorption element at least indirectly during an accident-related application of force. The energy absorption element is formed as an essentially flat plate element.

13 Claims, 7 Drawing Sheets

ROOF FOR A MOTOR VEHICLE

CROSS REFERENCE TO RELATED APPLICATION

This application claims priority under 35 U.S.C. §119 from German Patent Application No. DE 10 2012 209 498.9, filed Jun. 5, 2012, the entire disclosure of which is herein expressly incorporated by reference.

BACKGROUND AND SUMMARY OF THE INVENTION

The invention concerns a roof for a motor vehicle and, in particular, a vehicle roof for a passenger motor vehicle with at least one roof panel element and with at least one lining element by which the roof element is at least partially lined towards a passenger compartment of the motor vehicle.

DE 101 63 822 B4 discloses a roof module for a motor vehicle which is provided for mounting between side parts of a passenger compartment below a roof skin extending between longitudinal pillars of the side parts. On a roof module's side facing the passenger compartment of the motor vehicle an energy absorption element in the form of a foam material is disposed.

From DE 10 2005 026 237 A1 a vehicle roof ceiling arrangement is known. The roof ceiling arrangement includes a main body by means of which a roof of the vehicle is at least partially lined towards a passenger compartment of the vehicle. Therein, in an intermediate space between the roof and the main body, a foam element is disposed.

Finally, from DE 10 2005 015 203 A1 a vehicle roof with a roof skin as a roof element and with a lining shell as a lining element is known. By means of the lining element, the roof element is at least partially lined towards a passenger compartment. The lining element is, with the formation of an intermediate space between the roof element and the lining element, spaced from the roof element.

In the intermediate space an air-conveying duct is provided, which in the case of a head impact on the lining element is supposed to absorb the impact energy. The air-conveying duct therefore acts as an energy absorption element which is coupled to the lining element and which at least partially decelerates a motor vehicle occupant impacting the energy absorption element at least indirectly during an accident-related application of force.

The known energy absorption elements, in particular, those in the form of foam elements, have a very high need for space. In addition, the accident behavior of the known vehicle roofs deserves improvement.

It is thus an object of the invention to further develop a motor vehicle roof of the type stated in the introduction in such a manner that improved accident behavior as well as lower need for space by the absorption element are provided.

This and other objects are achieved by a motor a vehicle roof for a passenger motor vehicle with at least one roof panel element and with at least one lining element by which the roof element is at least partially lined towards a passenger compartment of the motor vehicle. At least one energy absorption element is coupled to the lining element for the at least partial deceleration of an occupant impacting the energy absorption element at least indirectly during an accident-related application for force, and is characterized in that the energy absorption element is formed as an essentially flat plate element.

Such a roof for a motor vehicle according to the invention, in particular a passenger motor vehicle, comprises at least one roof element and at least one lining element. Therein the roof element is, by way of the lining element, at least partially lined toward a passenger compartment of the motor vehicle. Furthermore, there is provided, coupled to the lining element, at least one energy absorption element by which an occupant in the passenger compartment is to be decelerated if said occupant impacts the energy absorption element at least indirectly during an accident-related application of force.

To realize an improved accident behavior as well as a low need for space of the energy absorption element it is provided according to the invention that the energy absorption element is formed as an essentially flat plate element. The plate element can, in case of an impact of the head of the occupant, decelerate the head without leading to undesirably high acceleration values. Thereby the vehicle occupant can be protected against serious injuries.

Along with this, it is provided that, for at least partial deceleration of the occupant, in particular her/his head, upon its at least indirectly impacting the plate element, opposing impetuses can be applied to the occupant or her/his head by means of the plate element through back-and-forth springing of the plate element. In other words, if the head of the occupant strikes the plate element at least indirectly, e.g. with the intermediation of the lining element, then an acceleration of the plate element occurs which is briefly greater than an accident-related acceleration of the head. The plate element springs initially away from the head, in particular the lining element, and subsequently as a consequence of the coupling to the lining element once again onto the head. This sequence of events occurs in only a very short amount of time and is repeated many times over a very short period of time so that the plate element springs back and forth (or swings back and forth) for a very short time strikes the head at least indirectly, e.g. with intermediation of the lining element, and thereby applies opposing impetuses to the occupant or her/his head.

In this process, the opposing impetuses at least essentially oppose the accident-related acceleration and, accompanying it, an accident-related displacement of the occupant or her/his head so that the accident-related acceleration of the head shortly decreases and the occupant or her/his head is decelerated by the swinging back and forth of the plate element. In connection with this, the flat design leads to a plate element rigidity behavior and weight advantageous for applying the opposing impetuses.

The deceleration of the head as well as a path for the head to press into the plate element depend in particular on the modulus of elasticity of the plate element. By an appropriate setting of the modulus of elasticity, the accident behavior of the plate element can be set as needed. At the same time, the principle of action of the plate element is based above all on the modulus of elasticity at the moment of a flexure of the plate element as a consequence of the at least indirect impact of the head, on the weight of the plate element, and on the law of conservation of momentum, e.g. in cooperation with bonding of the plate element and lining element over a large surface. In connection with this, the plate element can briefly accelerate more rapidly than the head.

In an advantageous embodiment of the invention, the plate element lies at least partially on the lining element, in particular over an at least predominant area of its surface extension. Through this lying on the surface, tensile forces arise which lead to a particularly advantageous and rapid back-and-forth springing of the plate element so that the occupant can be decelerated very well.

It has been shown to be particularly advantageous if the plate element is spaced, in particular completely, from the roof element. Therefore no coupling to and/or other support of the plate element on the roof element is provided so that the plate element can spring back and forth unhindered and apply opposing impetuses to the occupants.

A particularly advantageous, since essentially unhindered, swinging back and forth of the plate element is provided if the plate element is disposed in an intermediate space bounded on one side by the roof element and on the other side by the lining element with spacing from the roof element.

In an advantageous development of the invention, a rib structure is provided by which the plate element is reinforced. The rib structure lends a high modulus of elasticity to the plate element so that it has high elasticity and, as a consequence, very good back-and-forth springing and opposing impetuses for decelerating the occupant or her/his head which it can apply to them.

It has been shown to be advantageous if the rib structure extends at least over a predominant part of a surface, e.g. in the form of a broadside, of the plate element. The plate element is thus reinforced over a large surface area and has very good spring behavior.

In order to keep the number of parts and the costs of the vehicle roof low, the rib structure and the plate element are preferably formed as one piece with one another. The rib structure is formed, for example, in the framework of an initial forming process and/or a reforming process to produce the plate element.

The vehicle roof is furthermore distinguished in that the plate element is made of a metallic material, in particular of sheet steel. Thus, the plate element has a corresponding modulus of elasticity as a consequence of which the plate element can spring back and forth in only a short time and as a consequence can decelerate the occupant very well.

In an additional embodiment, it is provided that the plate element is formed of plastic, whereby a low weight of the plate element is realized.

Moreover it has been shown to be advantageous if the plate element is disposed on the lining element and lies over the surface of the lining element's side facing away from the passenger compartment. The plate element is thus covered over by the lining element and cannot be perceived visually by the occupant. Furthermore, lying over the surface leads to a very good back-and-forth springing.

In connection with this, the plate element can be disposed on an external rear side of the lining element, said rear side facing away from the passenger compartment. Similarly, it is possible that the plate element is disposed within the lining element. In connection with this, the lining element can comprise a receiving space in which the plate element is disposed. In other words, the plate element is not disposed on a side facing the passenger compartment but rather on the side facing away from the passenger compartment and is covered over towards the passenger compartment by the lining element.

In order to provide a connection of the plate element to the lining element, in a further development of the invention, it is provided that the plate element is glued to the lining element. This glued connection is particularly favorable from the standpoint of weight. In so doing, it can be provided that the lining element and the plate element are glued to one another over a complete surface area on which they lie on one another. Through the gluing over a large surface area, very high tensile forces act which cause a very good swinging behavior of the plate element so that it swings back and forth frequently in only a very short time, impacts the head at least indirectly, and decelerates it.

Additional advantages, features, and details of the invention follow from the following description of preferred embodiment examples as well as with the aid of the drawings. The features and combinations of features stated above in the description as well as the features and combinations of features stated below in the figure description and/or shown only in the figures are not only usable in the combination specified in each case but rather also in other combinations or alone without leaving the scope of the invention.

DETAILED DESCRIPTION OF THE DRAWINGS

Figure 1:
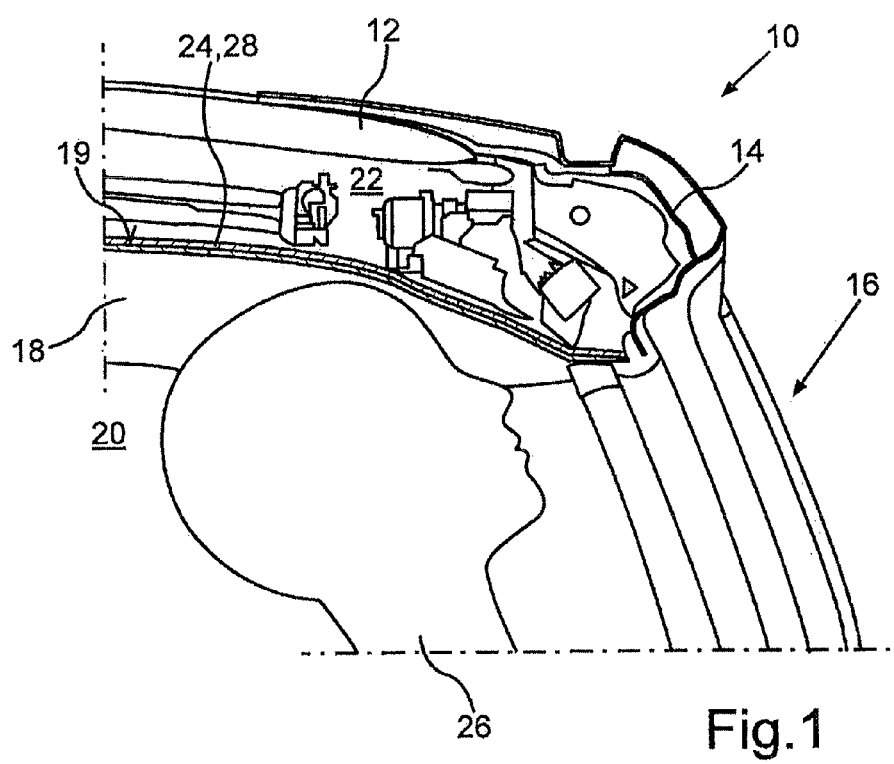
FIG. 1 is a partial schematic sectional view of a roof for a passenger motor vehicle with at least one roof element, with at least one lining element at least partially lining the roof element towards a passenger compartment of the passenger motor vehicle, and with an energy absorption element coupled to the lining element, said energy absorption element being disposed in an intermediate space between the roof element and the lining element, where the energy absorption element is formed essentially as a flat plate element.

FIG. 1 shows a vehicle roof 10 of a passenger motor vehicle with a roof panel element 12 as the first roof element. The roof panel element 12 forms the outer roof skin. The vehicle roof 10 includes as a second roof element a cross member element 14. In FIG. 1, a front left vehicle pillar 16 (the A pillar) can also be seen.

The vehicle roof 10 furthermore includes a lining element 18, which is also called a roof ceiling. The lining element 18 lines the roof panel element 12 and the cross member 14 at least partially towards a passenger compartment 20 of the passenger motor vehicle.

Along with this, as can be seen from FIG. 1, the lining element 18—with the formation of an intermediate space 22 between the lining element 18 and the roof panel element 12 as well as between the lining element 18 and the cross member 14—is spaced from the roof panel element 12 and cross member 14 in the vertical direction of the vehicle. In the intermediate space 22 at least one energy absorption element 24 is disposed, which is also called an absorber.

Figure 2:
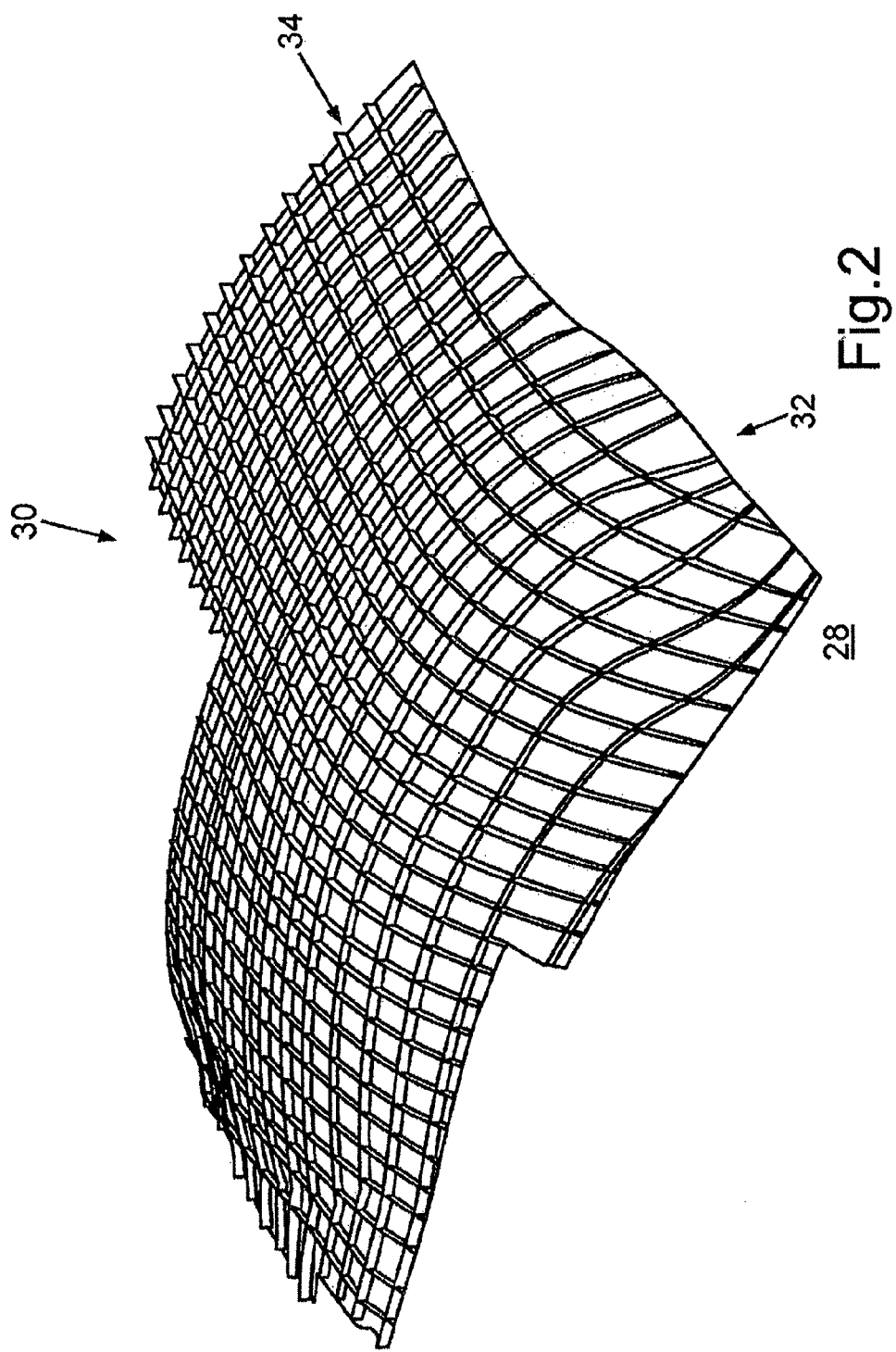
FIG. 2 is a schematic and perspective top view of a form of embodiment of the plate element which is reinforced by way of a rib structure.
Figure 3:
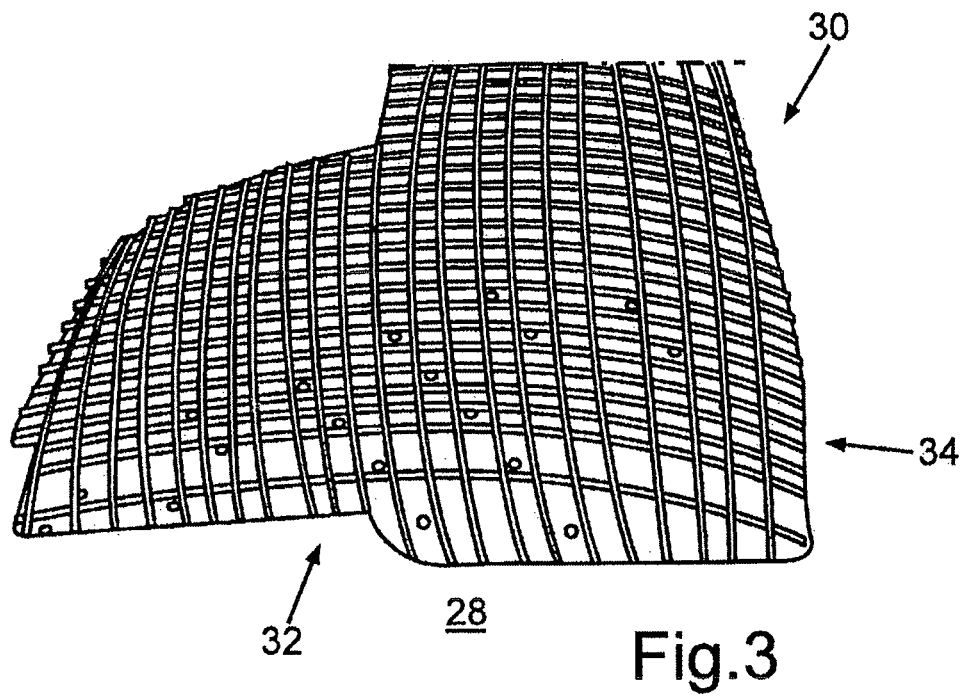
FIG. 3 is an additional schematic and perspective top view of the plate element according to FIG. 2.

As can be seen from FIG. 2 and FIG. 3, the energy absorption element 24 is formed as an essentially flat plate element 28. As a consequence of this design the energy absorption element 24 has, in particular in the vertical direction of the vehicle, only a very low need for space. Furthermore, the plate element 28 makes possible very good accident behavior of the vehicle roof 10 since the plate element 28 can decelerate, as illustrated with the aid of a head dummy 26, the head of an occupant of the passenger compartment 20 particularly well if the head strikes the plate element 28 with the intermediation of the lining element 18.

The plate element 28 has a first face facing away from the passenger compartment 20 in the form of a first broadside 30 as well as a second face facing toward the passenger compartment 20 in the form of a second broadside 32. The plate element 28 is disposed on the lining element 18 and, via its second broadside 32, lies on a side 19 of the lining element 18 over a very large surface area, said side 19 facing away from the passenger compartment 20. Along with this, it can be provided that the plate element 28 lies on the lining element 18 over the plate element's entire second broadside 32.

For fastening the plate element 28, it is provided that it is glued to the lining element 18 over a large surface area. For this, the plate element 28 is preferably glued to the lining element 18 over the plate element's complete second broadside 32.

The principle of action of the plate element 28 is illustrated with the aid of FIGS. 5*a*-*d*. In this connection, FIGS. 5*a*-*d* show in chronological order a sequence from an accident simulation in which a head dummy 26 is moved against the vehicle roof 10, i.e. is tossed in a tossing direction. In other words, FIGS. 5*a*-*d* show different chronologically sequential states of the dummy head 26 in its movement during an accident simulation. Thereby, an accident-related displacement of the head of the occupant is simulated which, for example, occurs during an accident of the passenger motor vehicle. As a consequence of the accident-related displacement, the head 26 impacts the vehicle roof 10 or the plate element 28 with the intermediation of the lining element 18. The statements made relating to the head dummy 26 in the framework of the accident simulation can be carried over to the head of the occupant, which in an accident accelerates in the direction of the vehicle roof 10, thereby experiences accident-related displacement, and impacts the vehicle roof 10.

Figure 5A:
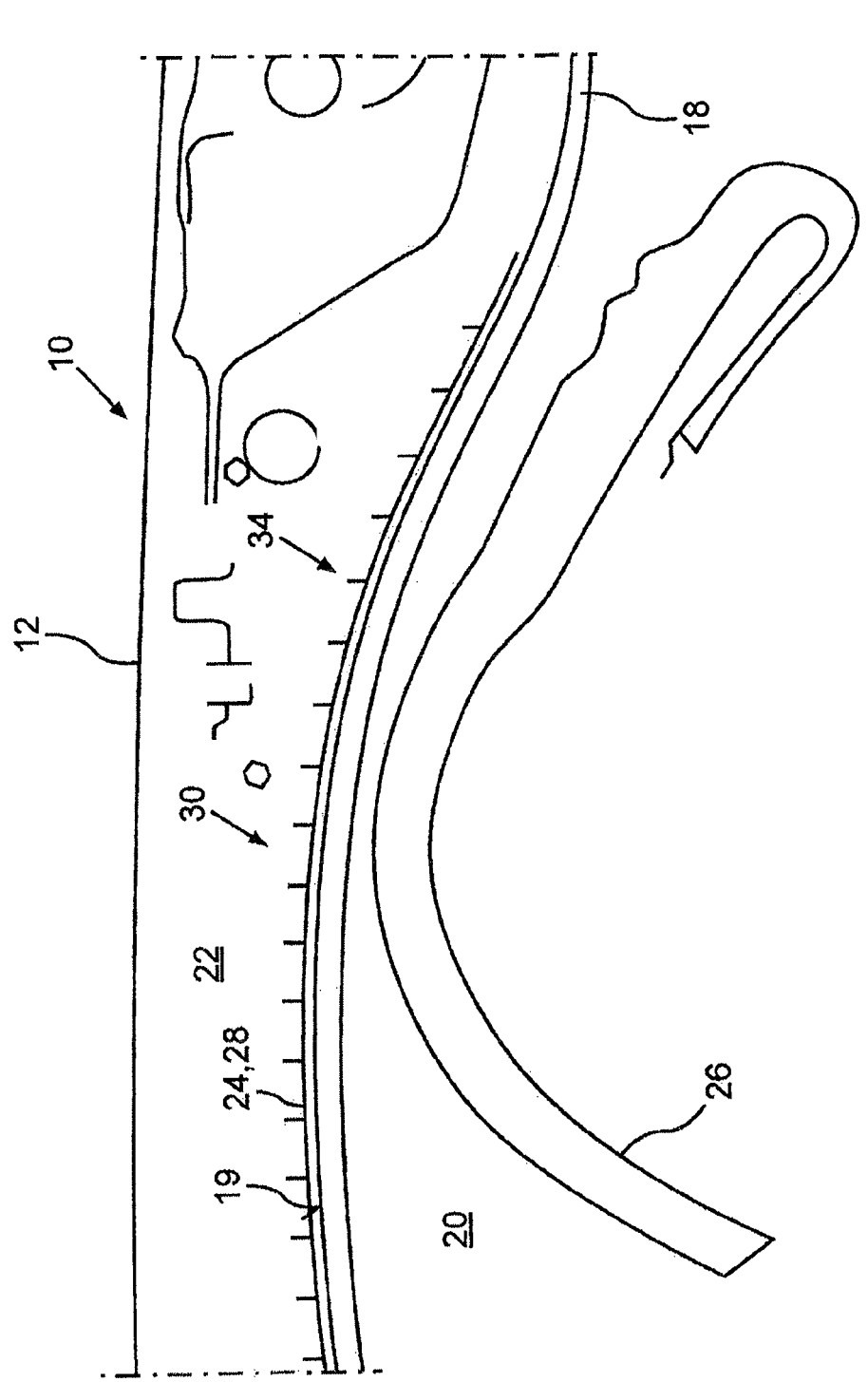
FIGS. 5a-d are partial schematic sectional views of the vehicle roof at different points-in-time in an accident simulation in order to illustrate the principle of action of the plate element, in which simulation a head dummy is moved against the vehicle roof to simulate an accident-related displacement resulting from an impact of the head of a vehicle occupant on the vehicle roof.

For the simulation of an accident the head dummy 26 is tossed in the direction of the vehicle roof 10 and thereby sharply accelerated in its tossing direction. In FIG. 5*a* the head dummy 26 is first spaced from the lining element 18, but starting from an initial position, is displaced in time prior to the acceleration in the direction of the vehicle roof 10.

Figure 5B:
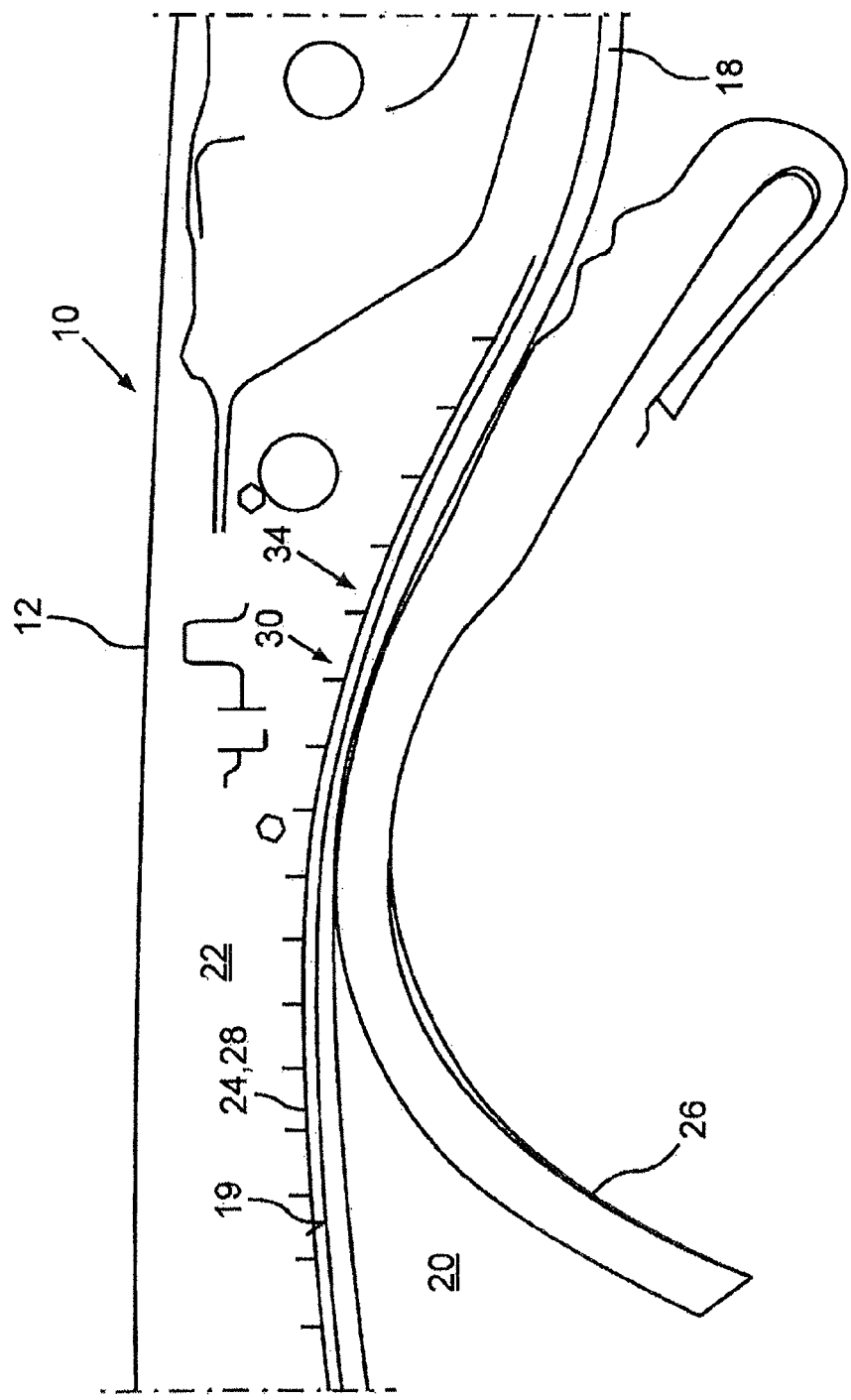
Figure 5C:
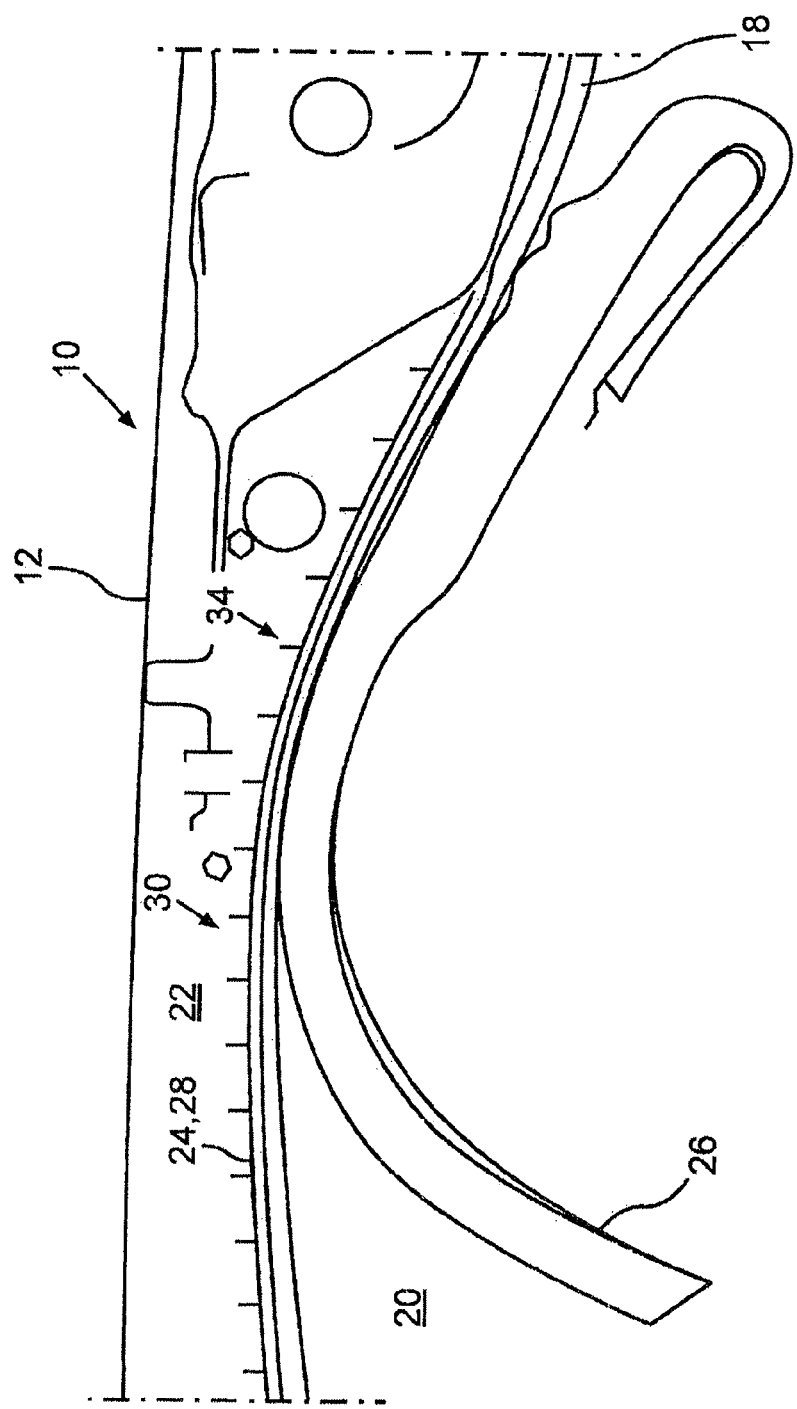
Figure 5D:
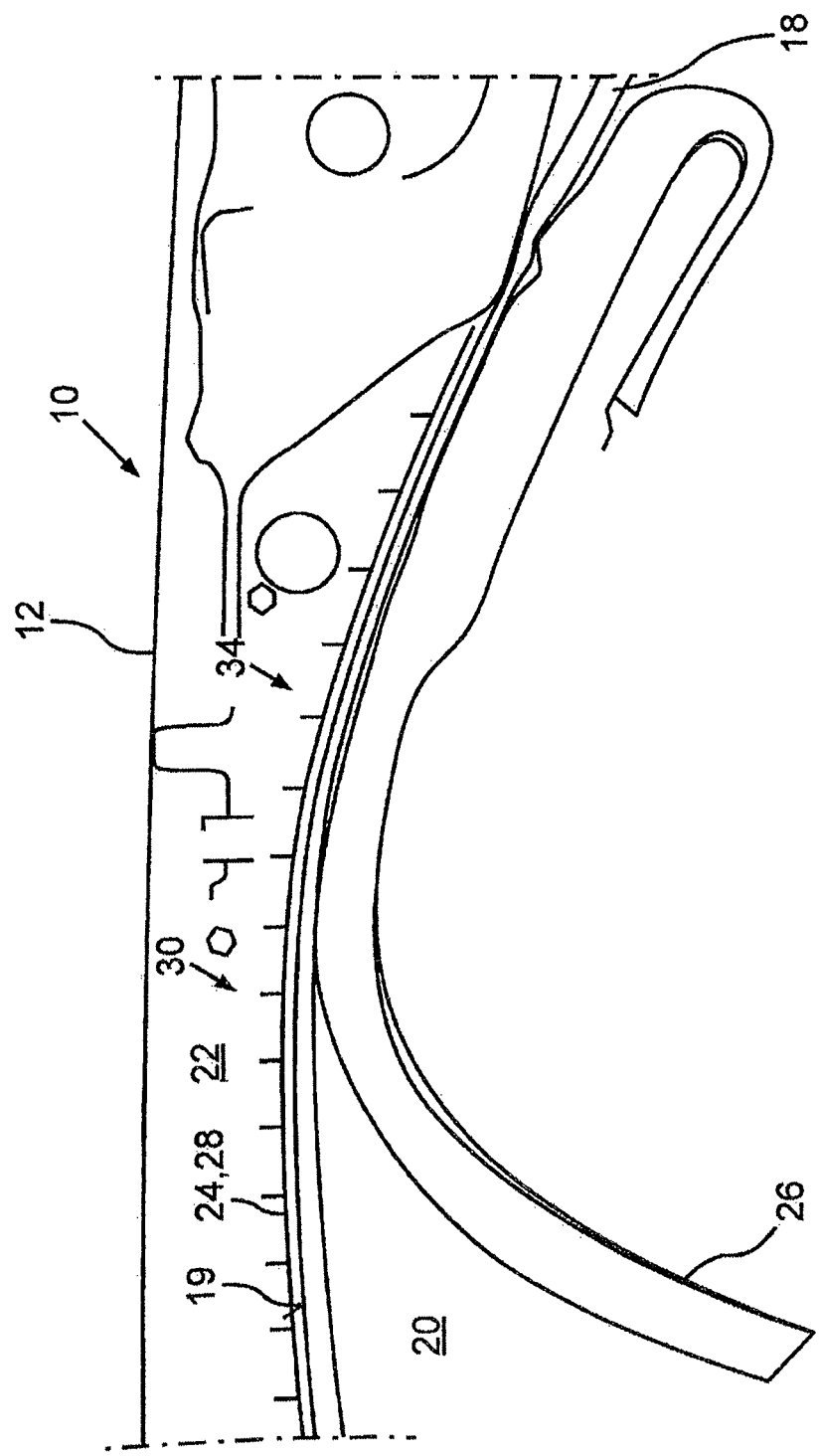

After traversing a path, the head dummy 26 impacts the lining element 18 and with its intermediation the plate element 28, as is shown in FIG. 5*b*. Due to the acceleration acting on the head dummy 26, it is displaced further and plunges still somewhat further into the lining element 18, as is shown in FIGS. 5*c* and 5*d*.

By impacting the lining element 18 and with the lining element's intermediation, the plate element 28 is also accelerated away from the head dummy 26 and briefly has a greater acceleration than the head dummy 26. In connection with this, the lining element 18 and the plate element 28 are once again distanced (spaced) from the head dummy 26, which is not represented in FIGS. 5*a*-*d*.

Due to the coupling (gluing) to the lining element 18, the acceleration of the plate element 28 briefly drops below that of the head dummy 26 or the head, and the plate element 28 once again springs back onto the lining element 18 and onto the head dummy 26. The plate element 28 then once again strikes, with intermediation of the lining element 18, the head dummy 26. The head dummy 26 then in the further course of events once again plunges into lining element 18 and with its intermediation impacts the plate element 28.

Subsequently thereto, the lining element 18 and the plate element 28 once again move away from the head dummy 26 or the head and the process is repeated anew.

This process, i.e. the head dummy head 26 or the head impacting the lining element 18 and the plate element 28 and being distanced from them transpires in a very short time and is repeated many times within a very short period of time so that a springing back and forth of the plate element 28 results. As a consequence of this springing back and forth, the plate element 28 repeatedly impacts, with the intermediation of the lining element 18, the head dummy 26, due to which by means of the plate element 28 via the lining element 18 opposing impetuses are applied to the head dummy 26 and therefore to the head. The opposing impetuses counteract the acceleration and displacement of the head dummy 26 and therefore the accident-related acceleration and displacement of the head so that the head dummy 26 or the head is decelerated. This leads to realization of a particularly low so-called HIC value (HIC standing for Head Injury Criterion), which represents one criterion for evaluating acceleration-related head injuries as a result of accidents.

In this process the gluing over a large surface counteracts the springing of the plate element 28 away from the lining element 18 or the head. Thereby, a particularly high number of back-and-forth springing processes result which decelerate the head. Furthermore, the plate element 28 has a corresponding modulus of elasticity and therefore an advantageous elasticity which promotes the back-and-forth springing. In interplay with a corresponding weight of the plate element 28 effective opposing impetuses decelerating the head result.

The plate element 28 is completely spaced from the roof panel element 12 and the cross member element 14 (roof elements) so that it can spring back and forth or swing back and forth essentially unhindered and frequently in only a short time apply opposing impetuses to the head without the roof elements affecting in an undesirable manner the springing of the plate element 28, in particular away from the lining element 18 and from the head.

From FIGS. 2 and 3 it can be seen that the plate element 28 is provided on its first broadside 30 with a rib structure 34 which includes a plurality of ribs. The plate element 28 is reinforced by use of the rib structure 34 and therefore has an advantageous modulus of elasticity.

The plate element 28 can be formed from a plastic, where the plate element 28 and the rib structure 34 are advantageously formed, e.g. by injection molding, as one piece with one another. In so doing, the rib structure 34 extends over the complete first broadside 30 (first face) so that the plate element 28 is uniformly reinforced over a large surface and over its first face. The plate element 28 can be curved in its outer contour, essentially adapted to a corresponding shape and outer contour of the lining element 18 so that the plate element 28 lies on the lining element 18 over a large part of its surface. In particular, the plate element 28 can, through its curvature, be adapted to form a so-called helmet of the lining element 18, whereby very good freedom for the head is provided.

Figure 4:
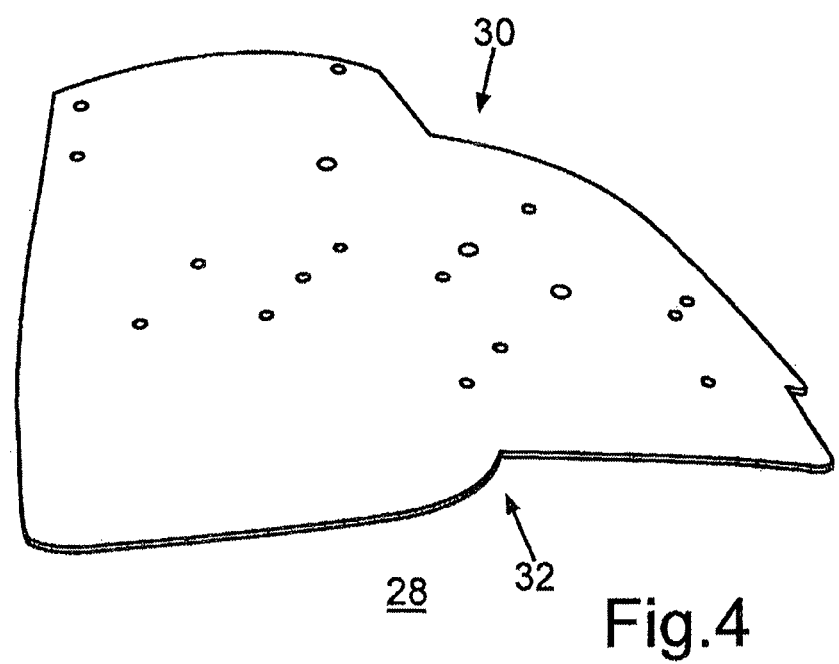
FIG. 4 is a schematic and perspective top view of an additional form of embodiment of the plate element according to FIGS. 2 and 3.

FIG. 4 shows an additional form of embodiment of the plate element 28 which can be used as an energy absorption element 24 of the vehicle roof 10. In this embodiment example, the plate element 28 is formed as a sheet metal plate. The function, and in particular the principle of action, correspond to the plate element 28 according to FIGS. 1 to 3 and 5*a-d*. The sheet metal plate has a modulus of elasticity which is particularly advantageous for the back-and-forth springing, i.e. an advantageous elasticity as well as an advantageous weight.

The plate element 28 according to FIG. 4 also has broadsides 30, 32 with large surfaces areas, where the plate element 28 according to FIG. 4 can lie via its second broadside 32 over a particularly large surface area, in particular completely, on the lining element 18 and can be glued to it.

REFERENCE NUMBER LIST

10 Vehicle roof
12 Roof panel element
14 Cross member element
16 Vehicle pillar
16 Lining element
19 Side
20 Passenger compartment
22 Intermediate space
24 Energy absorption element
26 Head dummy
28 Plate element
30 First broadside
32 Second broadside
34 Rib structure The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle roof for a passenger motor vehicle, comprising:
    a roof element;
    a lining element by which the roof element is at least partially lined on a passenger compartment side of the motor vehicle; and
    an energy absorbing plate element coupled to the lining element in only a localized area so as to form at least one helmet region of the passenger compartment and being operatively configured for at least partially decelerating an occupant impacting the plate element at least indirectly during an accident-related application of force,
    wherein the plate element has an essentially uniform thickness between a first broadside and a second broadside and is spaced apart from the roof panel element, and
    wherein the plate element is coupled to the lining element such that, as a consequence of being coupled to the lining element, the plate element is configured to spring back-and-forth and apply opposing impetuses to the occupant upon the occupant impacting the plate element during the accident-related application of force, thereby causing a partial deceleration of the occupant.

2. The vehicle roof according to claim 1, wherein the plate element lies at least partially over a surface of the lining element.

3. The vehicle roof according to claim 1, wherein the plate element is disposed in an intermediate space bounded on one side by the roof element and on an opposite side by the lining element.

4. The vehicle roof according to claim 1, wherein the plate element comprises a rib structure configured to reinforce the plate element.

5. The vehicle roof according to claim 4, wherein the rib structure extends over at least one of the first broadside and the second broadside of the plate element.

6. The vehicle roof according to claim 4, wherein the rib structure and the plate element are formed in one-piece.

7. The vehicle roof according to claim 1, wherein the plate element is made of a metal or plastic material.

8. The vehicle roof according to claim 1, wherein the plate element is a sheet steel plate element.

9. The vehicle roof according to claim 1, wherein the plate element is disposed on the lining element over a surface of the lining element that faces away from the passenger compartment.

10. The vehicle roof according to claim 1, further comprising: a glued connection of the plate element to the lining element.

11. The vehicle roof according to claim 1, wherein the plate element has a continuous broadside free of any gaps and recesses, the continuous broadside facing toward the lining element.

12. The vehicle roof according to claim 1, wherein the second broadside comprises a continuous broadside free of any gaps and recesses, the second broadside facing toward the roof element.

13. The vehicle roof according to claim 11, wherein the first broadside comprises an opposing continuous broadside, the first broadside facing toward the roof element.

* * * * *